May 31, 1932.　　B. O. AUSTIN ET AL　　1,860,523
AUTOMATIC SERIES PARALLEL CONTROL FOR SELF PROPELLED VEHICLES
Filed July 31, 1929
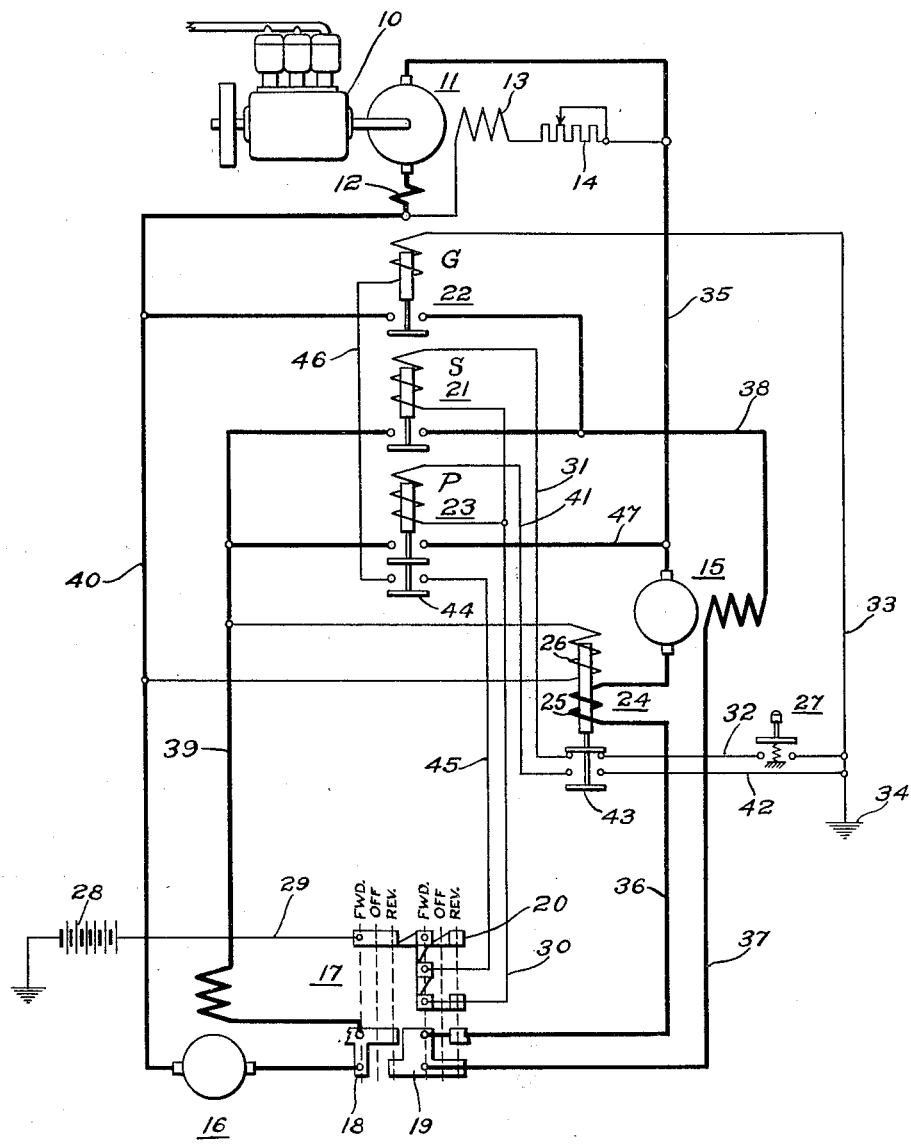
INVENTOR
Bascum O. Austin &
Norman H. Willby.
BY
　　　　ATTORNEY Patented May 31, 1932

1,860,523

UNITED STATES PATENT OFFICE

BASCUM O. AUSTIN AND NORMAN H. WILLBY, OF WILKINSBURG, PENNSYLVANIA, ASSIGNORS TO WESTINGHOUSE ELECTRIC AND MANUFACTURING COMPANY, A CORPORATION OF PENNSYLVANIA

AUTOMATIC SERIES-PARALLEL CONTROL FOR SELF-PROPELLED VEHICLES

Application filed July 31, 1929. Serial No. 382,572.

The invention relates, generally, to gas-electric power systems and more particularly to gas-electric power systems suitable for operating vehicles.

The object of the invention, generally stated, is the provision of a gas-electric power system which shall be simple and efficient in operation and that may be readily and economically manufactured.

A more specific object of the invention is to provide for automatically changing the motor connections of a gas-electric power system upon predetermined changes in load and speed.

It is also an object of the invention to provide for automatically changing the motor connections of a gas-electric power system to establish series-circuit connections for heavy loads and parallel-circuit connections for lighter loads.

The invention, accordingly, is disclosed in the embodiment thereof shown in the accompanying drawing and comprises the structural features, the combination of elements and the arrangement of parts that will be exemplified in the structure hereinafter set forth and the scope of the application of which will be indicated in the claims.

For a fuller understanding of the nature and objects of the invention, reference should be had to the following detailed description, taken in connection with the accompanying drawing, in which the single figure is a diagrammatic view of a gas-electric power system embodying the features of the invention.

Referring now to the drawing, 10 designates a gas engine of any well known type suitable for operating buses or railway vehicles. As illustrated, the gas engine is directly connected to a shunt generator 11 which is provided with an interpole field 12 and a shunt field 13. In this particular instance, a variable resistor 14 is provided for controlling the field strength of the generator.

Two suitable propelling motors 15 and 16 are electrically connected to the generator 11. In the embodiment of the invention illustrated, two series motors are shown but it will be readily understood that motors of any suitable type may be employed, depending on the operating conditions to be met.

In order to control the direction of movement of the vehicle and the operation of the motors, a manually operable controller 17 is provided. The controller is provided with contact segments 18 and 19 for establishing the desired motor circuits, and a contact segment 20 is provided for establishing the desired control circuits which will be traced hereinafter.

In order to establish the desired motor circuits to connect the motors in series and in parallel-circuit relation, three switches 21 to 23, inclusive, are provided. The switch 21 is disposed to establish series-circuit connections for the motors 15 and 16, while the switches 22 and 23 function to establish parallel connections.

In the operation of gas-electric vehicles, it is desirable to connect the motors in series-circuit relation, while starting and accelerating, and to change to parallel-circuit connections of the motors when the vehicle has reached a predetermined speed. When the operator is required to make the changes in the circuit connections during the operation of the vehicle, it is found that he seldom acts at the proper time, that is, when the load conditions on the motor require that a change be made from series-circuit connections to parallel-circuit connections of the motors or vice versa. Therefore, the most efficient operation of the system is not obtained.

In the present system, means which function automatically, upon the development of predetermined load conditions, to establish proper circuit connections for the motors is provided, so that the efficient operation of the system does not depend upon the human element.

In this particular system, a relay 24 is provided with a current coil 25 and with a voltage coil 26 to control the operation of the switches 21 to 23, inclusive, to effect the establishment of the desired motor-circuit connections in response to the load on the generator. As shown, the current coil 25 is connected in series-circuit relation to the motors to carry the motor current, and the voltage coil 26 is connected across the generator 11 to respond to the voltage developed.

It will be readily understood that the coils 25 and 26 may be designed to function under different load conditions. In this particular system, the coils are so proportioned that, as the vehicle is accelerated, the generator voltage increased and the motor current decreased, the relay 24 will stand in its lowermost position to establish an actuating circuit for the series switch 21.

Assuming now that the controller 17 has been actuated to stand in the forward position and that the switch 27 has been closed, then an actuating circuit for the series switch 21 is established which may be traced from the battery 28, through conductor 29, the contact segment 20 of the controller 17, conductor 30, the actuating coil of switch 21, conductor 31, relay 24, conductor 32, switch 27 and the conductor 33, to the ground at 34.

When the switch 21 is closed, the motors are connected in series-circuit relation. The established motor circuit extends from the generator 11 through conductor 35, the motor 15, current coil 25, conductor 36, contact segment 19 of the controller 17, conductor 37, the series field winding of the motor 15, conductor 38, switch 21, conductor 39, the series field winding of the motor 16, contact segment 18 of the controller 17, the armature of the motor 16 and conductor 40, to the generator 11.

Assuming that the vehicle is so accelerated as to increase the generator voltage and decrease the motor current, the relay 24 is actuated in response to the increased energization of the voltage coil 26. When the relay stands in its uppermost position, a circuit is established for energizing the parallel switch 23, and the energizing circuit for the series switch 21 is interrupted. The energizing circuit for the switch 23 may be traced from the energized conductor 30, through the actuating coil of switch 23, conductor 41, the interlock 43 of the relay 24 and conductor 42, to ground 34.

When the switch 23 is actuated to its closed position, the interlock 44 carried thereby establishes an energizing circuit for the switch 22 which extends from the energized contact segment of the controller 17, through conductor 45, the interlock 44, conductor 46, the actuating coil of switch 22 and conductor 33, to ground at 34. Therefore, the switch 22 is closed immediately after the switch 23 is actuated to establish a motor circuit.

The motors are now connected in parallel-circuit relation, the circuit for the motor 15 extending from the generator 11, through conductor 35, the armature of the motor 15, the current coil 25 of the relay 24, conductor 36, contact segment 19 of the controller 17, conductor 37 and series field winding of the motor, conductor 38, switch 22 and a conductor 40, to the generator, while the circuit of the motor 16 extends from the conductor 35, through conductor 47, switch 23, conductor 39, series field winding of the motor 16, contact segment 18 of the controller 17, the armature of the motor 16 and the conductor 40, to the generator.

Assuming that the vehicle, with the motors connected in parallel-circuit relation, begins to climb a heavy grade, a heavy load will be imposed on the motors whereby they will be decelerated to take a heavier current and ensure a decreasing voltage across the generator. Therefore, the current flowing in the current coil 25 of the relay 24 will be greatly increased, while the energization of the voltage coil 26 will be decreased. As a result, the relay will drop to its lowermost position to re-establish the series-circuit connections of the motors.

The switch 27 may be disposed to be actuated in conjunction with any of the members which the operator has to actuate, in order to set the vehicle in motion. Preferably, the switch will be disposed to be actuated when the accelerating lever is actuated. An accelerating lever is not illustrated in conjunction with the switch since it does not constitute any part of the invention and may be connected to the switch in any well known manner.

Since certain changes may be made in the above construction and different embodiments of the invention may be made without departing from the scope thereof, it is intended that all matter contained in the above description, or shown in the accompanying drawing, shall be interpreted as illustrative and not in a limiting sense.

I claim as my invention:

1. In a gas-electric power system for vehicles, in combination, an internal-combustion engine, a generator driven by the engine, a plurality of motors disposed to be connected to the generator, means operable to connect the motors in series and in parallel-circuit relation, and means differentially responsive to the generator current and voltage for controlling the operation of said connecting means to establish predetermined motor connections.

2. In a gas-electric power system for vehicles, in combination, an internal-combustion engine and a generator driven by the engine, a plurality of motors disposed to be connected to the generator, electro-responsive means operable to connect the motors in series and in parallel-circuit relation, and relay means differentially responsive to the voltage and load of the generator for controlling said electro-responsive means to establish series-circuit connections for the motors when the load is heavy and parallel-circuit connections when the load is light.

3. In a gas-electric power system for vehicles, in combination, an internal-combustion engine, a generator driven by the engine, a plurality of motors disposed to be connected to the generator, means for connecting the motors in series and in parallel-circuit relation, means for operating the connecting means to connect the motors in series circuit relation to the generator, and a relay differentially responsive to the load current of the generator and the generator voltage for maintaining the series circuit connections for the motors when the load is heavy and for establishing parallel-circuit connections when the load is light, said relay being disposed to function automatically upon predetermined changes in generator voltage and load.

4. In a gas-electric power system for vehicles, in combination, an internal-combustion engine, a generator driven by the engine, a plurality of motors disposed to be connected to the generator, a relay having differentially-disposed current and voltage coils, said current coil being connected in circuit to carry the motor currents and the voltage coil being disposed to respond to the generator voltage, and means controlled by the relay for connecting the motors in series and parallel-circuit relation, said relay being disposed to function automatically upon predetermined changes in the load on the generator to establish the desired circuit connections.

5. In a system of control for a gas-electric vehicle, the combination with a plurality of propelling motors, a generator for supplying power to the motors and an engine for driving the generator, of a series switch operable to connect the motors in series-circuit relation to the generator, a plurality of paralleling switches operable to connect the motors in parallel-circuit relation to the generator, and means for selectively controlling the series switch and the paralleling switches to establish different motor connections, said means being differentially responsive to the voltage of the generator and the load current.

6. In a power-transmission system for vehicles, the combination with a generator and an internal-combustion engine for driving the generator, of a plurality of traction motors disposed to receive power from the generator, a plurality of switches operable to connect the motors to the generator, and a differential relay for selectively controlling the energization of the connecting switches, said relay being responsive to both the generator voltage and the load current, thereby to effect the establishment of different motor connections, depending upon the speed and load conditions.

7. In a power-transmission system for vehicles, the combination with a generator and an internal-combustion engine for driving the generator, of a plurality of traction motors disposed to be connected to the generator, a plurality of switches operable to connect the traction motors in series or parallel-circuit relation to the generator, and switching means differentially responsive to predetermined relative values of load current and generator voltage for selectively operating the connecting switches to cause the traction motors to be connected in series-circuit relation with the generator for slow-speed heavy-load operation and in parallel-circuit relation for high-speed light-load operation.

8. In a control system for gas-electric vehicles, the combination with a generator, an internal-combustion engine for driving the generator, of a plurality of traction motors, of means including a plurality of electro-responsive switches for connecting the motors to the generators in different circuit relations, means for initially effecting the energization of certain of said switches to connect the motors to the generator to accelerate the vehicle, and means for thereafter automatically controlling the energization of the connecting switches in accordance with the voltage and load of the generator to reconnect the motors in parallel-circuit relation when the load decreases to a predetermined value and to reestablish the series connection of the motors when the load again increases above said predetermined value.

In testimony whereof, we have hereunto subscribed our names this 24th day of July, 1929.

BASCUM O. AUSTIN.
NORMAN H. WILLBY.